United States Patent

Nyorkor et al.

[11] Patent Number: 5,224,620
[45] Date of Patent: Jul. 6, 1993

[54] MAGNETIC FUEL TANK CAP AND ADAPTER FOR AUTOS AND TRUCKS

[76] Inventors: Sahr A. A. Nyorkor, 6550 E. 55th Pl., Indianapolis, Ind. 46226; George Spector, 233 Broadway RM 702, New York, N.Y. 10279

[21] Appl. No.: 897,414

[22] Filed: Jun. 12, 1992

[51] Int. Cl.$^5$ .............................................. B65D 51/24
[52] U.S. Cl. .................................... 220/379; 220/230; 220/DIG. 33; 248/206.5; 248/309.4; 248/683
[58] Field of Search ............... 220/230, 287, 288, 379, 220/744, DIG. 32, DIG. 33; 248/206.5, 683, 309.4

[56] References Cited

U.S. PATENT DOCUMENTS

| | | | |
|---|---|---|---|
| 2,702,683 | 2/1955 | Green et al. | 220/230 X |
| 2,717,096 | 9/1955 | Henderson | 220/379 X |
| 2,758,743 | 8/1956 | Smith | 220/379 X |
| 2,802,592 | 8/1957 | Clifton | 220/379 X |
| 4,320,853 | 3/1982 | Moore | 220/375 |
| 4,653,711 | 3/1987 | Marshell | 220/DIG. 33 X |
| 4,744,482 | 5/1988 | Ohsawa | 220/DIG. 33 X |
| 4,746,089 | 5/1988 | Clapper | 248/309.4 |
| 4,957,266 | 9/1990 | Ellis | 248/683 |

*Primary Examiner*—Allan N. Shoap
*Assistant Examiner*—Vanessa Caretto

[57] ABSTRACT

A magnetic fuel tank cap is provided for closing off the filling inlet tube of a motor vehicle which consists of an externally threaded cylindrical shank, which threadably engages with the filling inlet tube of the motor vehicle. A head is secured to the shank and is larger than the shank. When the head is turned to drive the shank into the filling inlet tube, the head will seal the filling inlet tube. A magnet is on top of the head for releasably connecting the head, when inverted, to a metallic part of the motor vehicle after the shank is removed from the filling inlet tube. In other embodiments adaptors are provided to releasably connect the head of a conventional fuel tank cap to the metallic part of the motor vehicle.

1 Claim, 1 Drawing Sheet

MAGNETIC FUEL TANK CAP AND ADAPTER FOR AUTOS AND TRUCKS

BACKGROUND OF THE INVENTION

The instant invention relates generally to magnetized retaining devices and more specifically it relates to a magnetic fuel tank cap which provides a magnet on top of the cap, so that the cap can be retained to the frame of the motor vehicle when removed from the filling inlet tube.

There are available various conventional magnetized retaining devices which do not provide the novel improvements of the invention herein disclosed.

SUMMARY OF THE INVENTION

A primary object of the present invention is to provide a magnetic fuel tank cap that will overcome the shortcomings of the prior art devices.

Another object is to provide a magnetic fuel tank cap that contains a magnet built-into the top of the cap, so that the cap can be magnetically retained to a metallic part of a motor vehicle when the cap is removed from the filling inlet tube.

An additional object is to provide a magnetic fuel tank cap in which an adaptor having a magnet is attachable to a conventional fuel tank cap, so that the magnet attached to the cap can be magnetically retained to the metallic part of the motor vehicle when the cap is removed from the filling inlet tube.

A further object is to provide a magnetic fuel tank cap that is simple and easy to use.

A still further object is to provide a magnetic fuel tank cap that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
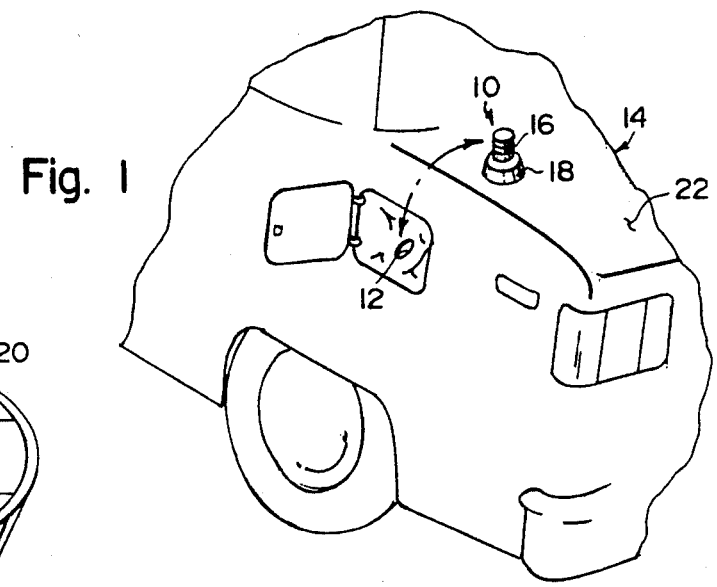
FIG. 1 is a perspective view of a portion of a motor vehicle with the instant invention removed from the filling inlet tube and placed inverted onto the metallic housing of the motor vehicle.
Figure 2:
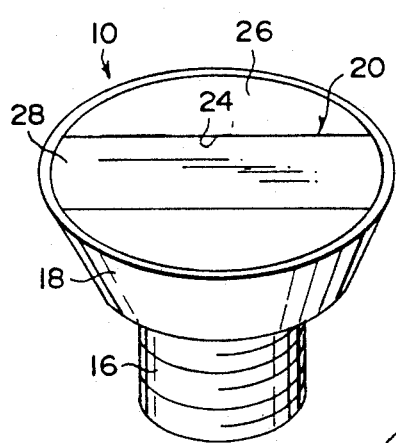
FIG. 2 is a perspective view of the instant invention per se showing the built-in magnet.

Turning now descriptively to the drawings, in which similar reference characters denote similar elements throughout the several views, FIGS. 1 and 2 illustrate a magnetic fuel tank ca 10 for closing off the filling inlet tube 12 of a motor vehicle 14 which consists of an externally threaded cylindrical shank 16 which threadably engages with the filling inlet tube 12 of the motor vehicle 14. A head 18 is secured to the shank 16 and is larger than the shank 16. When the head 18 is turned to drive the shank 16 into the filling inlet tube 12, the head 18 will seal the filling inlet tube 12. A structure 28 on top of the head 18 is for releasably connecting the head 18, when inverted, to a metallic part 22 of the motor vehicle 14 after the shank 16 is removed from the filling inlet tube 12.

The releasably connecting structure 20 includes the head 18 having a slot 24 formed in a top surface 26 thereof. A magnet 28 is permanently mounted within the slot 24 in the top surface 26 of the head 18. The head 18 when inverted can be releasably connected by the magnet 28 to the metallic part 22 of the motor vehicle 14 by the force of magnetism.

Figure 3:
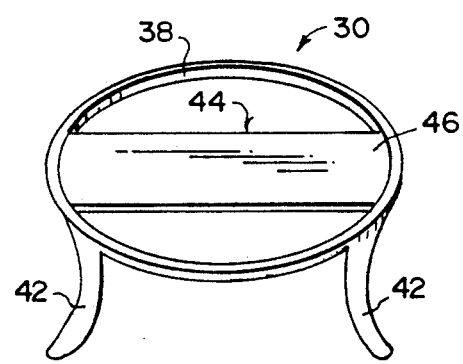
FIG. 3 is a perspective view of a first type of adaptor which can snap onto a conventional fuel tank cap.
Figure 4:
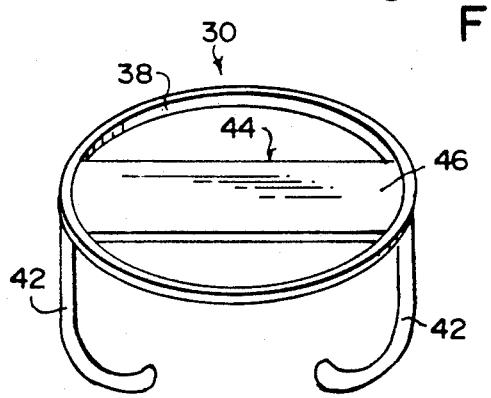
FIG. 4 is a perspective view of a second type of adaptor which can snap onto a conventional fuel tank cap.

FIGS. 3 and 4 show a magnetic fuel tank cap adaptor 30 for use on a conventional fuel tank cap 32 (shown in FIG. 5), of the type having an externally threaded cylindrical shank 34 Which threadably engages with the filling inlet tube 12 of the motor vehicle 14 and a head 36 secured to the shank 34. The adaptor 30 consists of an annular frame 38 being of the same size as the top surface 40 of the head 36. A plurality of spaced apart clips 42 extend downwardly from the annular frame 38 to retain the annular frame 38 to the top surface 40 of the head 36. The clips 42 can face outwardly as in FIG. 3, or inwardly as in FIG. 4. A structure 44 on the annular frame 38 is for releasably connecting the head 36, when inverted, to the metallic part 22 of the motor vehicle 14 after the shank 34 is removed from the filling inlet tube 12.

The releasably connecting structure is a magnet 46, permanently mounted in the annular frame 38. The head 36 when inverted can be releasably connected by the magnet 46 to the metallic part 22 of the motor vehicle 14 by the force of magnetism.

Figure 5:
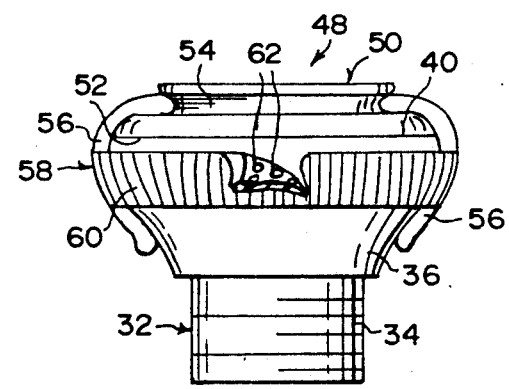
FIG. 5 is an elevational view of a conventional fuel tank cap with a third type of adaptor attached thereto, in which the magnetic member can be removed and replaced when needed and wherein the adaptor provides additional gripping action on the head of the cap.

FIG. 5 shows another magnetic fuel tank cap adaptor 48 for use on the conventional fuel tank cap 32 of the type having the externally threaded cylindrical shank 34, which threadably engages with the filling inlet tube 12 of the motor vehicle 14 and the head 36 secured to the shank 34. The adaptor consists of a magnetic member 50 having a bottom surface 52 of the same size as the top surface 40 of the head 36 and has a set back annular groove 54 thereabout. A plurality of spaced apart removable clips 56 extend downwardly from the set back annular groove 54 in the magnetic member 50 to retain the magnetic member 50 to the top surface 40 of the head 36. An elastic band 58 having a knurled exterior surface 60 and small suction cups 62 on its interior surface extends about the removable clips 56 and the head 36 of the conventional fuel tank cap 32 to hold the removable clips 56 thereto and to provide additional gripping action on the head 36 of the cap 32. The magnetic member 50 can be replaced on the head 36 when the need arises, by simply removing the elastic band 58 and the clips 56.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A magnetic fuel tank cap adaptor for use on a conventional fuel tank cap of the type having an externally threaded cylindrical shank, which threadably engages with a filling inlet tube of a motor vehicle, a head secured to the shank, and said head having a top surface, said adaptor comprising:

a) a magnet member having a bottom surface of the same size as said top surface of the head and having a set back annular groove thereabout;

b) a plurality of spaced apart removable clips extending downwardly from said annular groove in said magnet member to retain said magnet member to said top surface of the head; and c) an elastic band having an interior surface and a knurled exterior surface and small suction cups on said interior surface extending about said removable clips and the head of the conventional fuel tank cap to hold said removable clips thereto and to provide additional gripping action on the head of the cap.

* * * * *